US012380764B2

(12) United States Patent
Bernard

(10) Patent No.: US 12,380,764 B2
(45) Date of Patent: *Aug. 5, 2025

(54) LOCKING LINKS

(71) Applicant: IGT, Las Vegas, NV (US)

(72) Inventor: Jose Bernard, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,921

(22) Filed: Jun. 12, 2024

(65) Prior Publication Data

US 2024/0331491 A1 Oct. 3, 2024

Related U.S. Application Data

(63) Continuation of application No. 18/232,141, filed on Aug. 9, 2023, now Pat. No. 12,039,832, which is a continuation of application No. 17/868,009, filed on Jul. 19, 2022, now Pat. No. 11,763,626, which is a continuation of application No. 17/211,254, filed on Mar. 24, 2021, now Pat. No. 11,443,584.

(51) Int. Cl.
*G07F 17/34* (2006.01)
*G07F 17/32* (2006.01)

(52) U.S. Cl.
CPC ...... *G07F 17/3213* (2013.01); *G07F 17/3227* (2013.01)

(58) Field of Classification Search
CPC ... G07F 17/3213; G07F 17/3227; G07F 17/34
See application file for complete search history.

(56) References Cited

U.S. PATENT DOCUMENTS

| | | | |
|---|---|---|---|
| 11,443,584 | B1 | 9/2022 | Bernard |
| 11,763,626 | B2 | 9/2023 | Bernard |
| 12,039,832 | B2 | 7/2024 | Bernard |
| 2004/0224752 | A1 | 11/2004 | Nireki et al. |
| 2005/0079907 | A1 | 4/2005 | Aida |
| 2005/0170882 | A1 | 8/2005 | Osawa |
| 2010/0120507 | A1 | 5/2010 | Rodgers et al. |
| 2014/0243069 | A1 | 8/2014 | Hoffman et al. |
| 2015/0080101 | A1 | 3/2015 | Bristol et al. |
| 2019/0122505 | A1 | 4/2019 | Elias et al. |

OTHER PUBLICATIONS

Prior Art Google Patents Search History, 2021, 2 pages.
Official Action for U.S. Appl. No. 17/211,254, dated Dec. 24, 2021 21 pages.
Notice of Allowance for U.S. Appl. No. 17/211,254, dated Apr. 20, 2022 9 pages.
Supplemental Notice of Allowability for U.S. Appl. No. 17/211,254, dated May 17, 2022 5 pages.
Official Action for U.S. Appl. No. 17/868,009, dated Jan. 10, 2023 19 pages.
Notice of Allowance for U.S. Appl. No. 17/868,009, dated May 10, 2023 8 pages.
Notice of Allowance for U.S. Appl. No. 18/232,141, dated Mar. 13, 2024, 9 pages.

*Primary Examiner* — David L Lewis
*Assistant Examiner* — Shauna-Kay N. Hall
(74) *Attorney, Agent, or Firm* — Sheridan Ross P.C.

(57) ABSTRACT

The present disclosure relates generally to gaming systems that are capable of providing improved game functionality using locking links and a lock function that can be automatically performed in an electronic game during game play. The locking links and a lock function can increase player engagement and can lead to increased play of the gaming machine.

20 Claims, 8 Drawing Sheets

LOCKING LINKS

CROSS REFERENCE TO RELATED APPLICATIONS

The present application is a continuation of and claims priority to U.S. application Ser. No. 18/232,141, filed Aug. 9, 2023, which is a continuation of and claims priority to U.S. application Ser. No. 17/868,009, filed Jul. 19, 2022, now Issued U.S. Pat. No. 11,763,626, which claims priority to U.S. application Ser. No. 17/211,254, filed Mar. 24, 2021, now Issued U.S. Pat. No. 11,443,584, the entire disclosures of which are hereby incorporated by reference.

BACKGROUND

The present disclosure is generally directed to gaming systems and, in particular, toward gaming systems that implement locking links and a lock function.

Gaming machines typically offer a number of built-in game play features that contribute to the overall player experience. Any type of game play functionality that presents additional variable elements, some of which may increase a player's chances of winning, is often viewed as desirable since it can increase player engagement and can lead to increased play of the gaming machine.

BRIEF SUMMARY

In certain embodiments, the present disclosure relates to an Electronic Gaming Machine (EGM) comprising a first reel comprising a plurality of symbols. The plurality of symbols on the first reel can comprise a first lock symbol. A second reel of the EGM can also comprise a plurality of symbols. The plurality of symbols on the second reel can comprise a second lock symbol. The EGM can also comprise a third reel disposed between the first reel and the second reel. The third reel can also comprise a plurality of symbols. The plurality of symbols on the third reel comprising a symbol of interest.

A processor can be coupled with and can control rotation of the first reel, the second reel, and the third reel. A memory can be communicatively coupled with and readable by the processor. The memory can store therein a set of instructions which, when executed by the processor, can cause the processor to initiate rotation of the first reel, the second reel, and the third reel. The first reel, the second reel, and the third reel can then each rotate independently for different amounts of time. The instructions can further cause the processor to detect, upon the rotation of the first reel stopping, a position of the first lock symbol on the first reel, detect, upon the rotation of the second reel stopping, a position of the second lock symbol on the second reel, and create a locking link between the position of the first lock symbol on the first reel and the position of the second lock symbol on the second reel. The locking link can comprise a virtual line between the first lock symbol on the first reel and the second lock symbol on the second reel. The instructions can further cause the processor to detect, while the third reel is still rotating, a position of the symbol of interest on the third reel reaching a position through which the locking link passes. In response to detecting the position of the symbol of interest reaching the position through which the locking link passes, the instructions can further cause the processor to stop rotation of the third reel.

According to another embodiment, a method for operating an electronic game can comprise operating, by a gaming system, a first feature of the electronic game. The first feature can comprise a first indication of a lock function of the electronic game. A second feature of the electronic game can be operated by the gaming system independent of the first feature. The second feature can comprise a second indication of the lock function of the electronic game. A third feature of the electronic game can also be operated by the gaming system independent of the first feature and the second feature. The first feature and the second feature can be non-adjacent on the gaming system, the third feature can be disposed between the first feature and the second feature on the gaming system, and the third feature can comprise an indication of a symbol of interest in the electronic game.

Upon operation of the first feature stopping, the gaming system can detect a position of the first indication of the locking function. Upon operation of the second feature stopping, the gaming system can detect a position of the second indication of the locking function. The gaming system can then create a locking link between the position of the first indication of the locking function and the position of the second indication of the locking function. The locking link can comprise a virtual line connecting the position of the first indication of the locking function and the position of the second indication of the locking function. While the third feature is still operating, the gaming system can detect the symbol of interest at a position through which the locking link passes. In response to detecting the symbol of interest at the position through which the locking link passes, the gaming system can stop operation of the third feature.

According to another embodiment, a gaming system can comprise a processor and a memory coupled with and readable by the processor. The processor can store therein a set of instructions which, when executed by the processor, causes the processor to operate a first feature of an electronic game. The first feature can comprise a first indication of a lock function of the electronic game. The instructions can further cause the processor to operate a second feature of the electronic game independent of the first feature. The second feature can comprise a second indication of the lock function of the electronic game. The instructions can further cause the processor to operate a third feature of the electronic game independent of the first feature and the second feature. The first feature and the second feature can be non-adjacent on the gaming system, the third feature can be disposed between the first feature and the second feature on the gaming system, and the third feature can comprise an indication of a symbol of interest in the electronic game.

The instructions can further cause the processor to determine whether to apply the lock function of the electronic game. In response to determining to apply the lock function of the electronic game, the instructions can further cause the processor to detect, upon operation of the first feature stopping, a position of the first indication of the locking function, and detect, upon operation of the second feature stopping, a position of the second indication of the locking function. The instructions can further cause the processor to create a locking link between the position of the first indication of the locking function and the position of the second indication of the locking function. The locking link can comprise a virtual line connecting the position of the first indication of the locking function and the position of the second indication of the locking function. The instructions can further cause the processor to detect while the third feature is still operating, the symbol of interest at a position through which the locking link passes, and in response to detecting the symbol of interest at the position through which the locking link passes, stop operation of the third feature.

DETAILED DESCRIPTION

Embodiments of the present disclosure will be described in connection with gaming systems that are capable of providing improved game functionality. Illustratively, locking links and a lock function are described as being as a lock function that can be automatically performed in an electronic game during game play. In some examples described herein, the lock functions can be enabled by default or can be selectively enabled, for example, based on a game play history of other factors. The locking links and lock function can increase player engagement and can lead to increased play of the gaming machine.

Gaming devices described herein may include a gaming system, such as a slot machine or Electronic Gaming Machine (EGM), that implements locking links and a locking function. While embodiments of the present disclosure will be described in connection with the example of a slot machine, or EGM implementing locking links and a lock function, it should be appreciated that embodiments of the present disclosure are not so limited. For instance, a gaming system as described herein can be implemented on other types of computational devices, such as portable user devices, smartphones, tablets, laptops, Personal Computers (PCs), wearable devices, etc. Furthermore, it should be appreciated that embodiments of the present disclosure may apply to games other than slot games or reel-based games. For instance, embodiments of the present disclosure may be used in connection with any type of game such as bingo, keno, slots, matching games, table games, a game of skill, or in any other game that awards particular symbol combinations relative to positions on a user interface. Among other things, embodiments of the present disclosure provide a player with more ways to win a game, heightened anticipation during gameplay, the ability to alter the chances of winning in a game, the ability to alter the payout amount for a winning game outcome, and add excitement to the overall game-playing experience of games.

Figure 1:
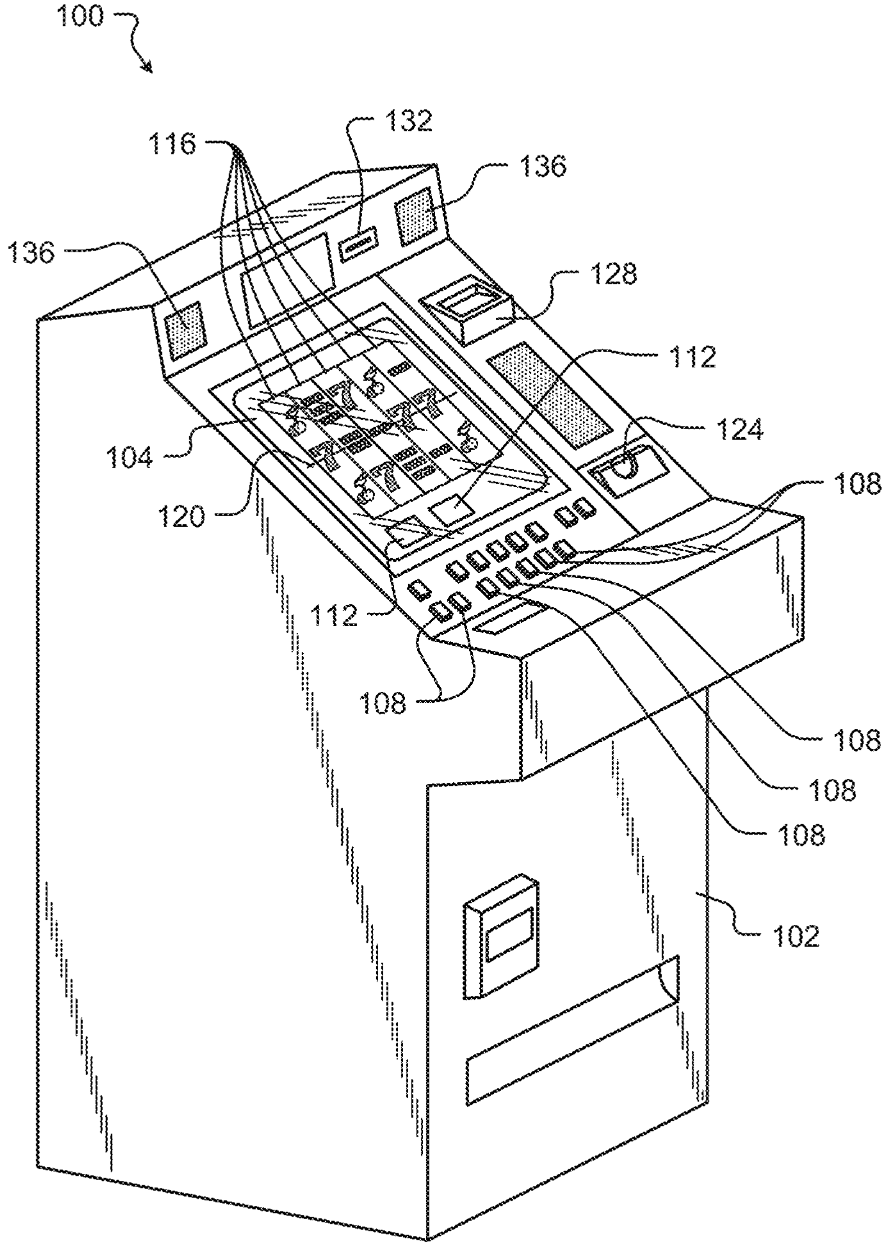
FIG. 1 is a diagram illustrating an exemplary gaming system in which embodiments of the present disclosure may be implemented.

FIG. 1 is a diagram illustrating an exemplary gaming system in which embodiments of the present disclosure may be implemented. More specifically, FIG. 1 illustrates a gaming system 100 that may be used to implement a hold and respin game or the like in which locking links and a lock function may be implemented. A gaming system 100 may include a portable or non-portable device used for executing a gaming application or multiple different gaming applications without departing from the scope of the present disclosure. Non-limiting examples of a gaming system can include, but are not limited to, an EGM, a Video Gaming Machine (VGM), a mobile communication device (e.g., a smartphone, laptop, tablet, wearable device, etc.), a personal computer (PC), etc. An EGM or VGM-type of gaming system 100 is shown in FIG. 1 in accordance with embodiments of the present disclosure.

The illustrative gaming system 100 of FIG. 1 is shown to include a support structure, housing or cabinet 102 which provides support for a plurality of displays, inputs, controls and other features of a conventional gaming machine. In the illustrated embodiment, a player can play the gaming system 100 while sitting. However, the gaming system 100 can be alternatively configured so that a player can operate it while standing or sitting. The illustrated gaming system 100 can be positioned on the floor but can be positioned alternatively (i) on a base or stand, (ii) as a pub-style table-top game, (iii) as a stand-alone gaming system on the floor of a casino with other stand-alone gaming system, or (iv) in any other suitable manner. The gaming system 100 can be constructed with varying cabinet and display configurations.

In one embodiment, a gaming system 100 can be configured to randomly generate awards and/or other game outcomes based on probability data. Since a gaming system 100 can generate outcomes randomly or based upon a probability calculation, there is no certainty that the gaming system 100 will provide the player with any specific award or other game outcome.

In some embodiments, a gaming system 100 may employ a predetermined or finite set or pool of awards, progressive awards, prizes or other game outcomes. In such an embodiment, as each award or other game outcome is provided to the player, the gaming system 100 removes the provided award or other game outcome from the predetermined set or pool. Once removed from the set or pool, the specific provided award or other game outcome cannot be provided to the player again. The gaming system 100 may provide players with some or all of the available awards or other game outcomes over the course of a play cycle and may or may not guarantee a designated number of actual wins and losses.

The gaming system 100 may include one or more displays 112. An illustrative display 112 may include a credit display that displays a player's current number of credits, cash, account balance or the equivalent. Another illustrative display 112 may include a bet display that displays a player's amount wagered.

The gaming system 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the gaming system 100.

In one embodiment, a player inserts an identification card into card reader 132 of gaming system 100. The identification card can be a smart card having a programmed microchip or a magnetic strip coded with a player's identification, credit totals, and other relevant information. In one embodiment, money may be transferred to a credit meter of the gaming system 100 through an electronic fund transfer and card reader 132 using the player's credit, debit, or smart card. When a player funds the gaming system 100, a processor of the gaming system 100 may determine the amount of funds entered and the corresponding amount is shown on the credit or other suitable display 112 as described herein.

In one embodiment, after appropriate funding of gaming system 100, the player presses an input device 108 to initiate game play. The input devices 108 may include various types of buttons, levers, gesture inputs, cameras, etc., that enable a player to start any game play or sequence of events. In one embodiment, upon appropriate funding, gaming system 100 begins game play automatically. In another embodiment, the player may be required to actuate or activate one of the play buttons to initiate play of gaming system 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The gaming system 100 may include other suitable wager buttons, such as a "repeat bet" button (e.g., repeating the bet made from the immediately last play of the gaming system 100 for the next play of the gaming system 100), one or more "select paylines" buttons, a "select re-spin operation" button, and one or more "select wager per payline" buttons.

Another type of input device 108 that may be provided on the gaming system 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The gaming system 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a gaming system 100 can provide dynamic sounds coupled with attractive multimedia images displayed on the display screen 104 to provide an audio-visual representation or to otherwise display full-motion video with sound to attract players to the gaming system 100. During idle periods, the gaming system 100 displays a sequence of audio and/or visual attraction messages to attract potential players to the gaming system 100.

In one embodiment, a base or primary game can include a slot game with one or more paylines 120. As will be discussed in further detail herein, the game provided by the gaming system 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 may be used to display different sets of symbols in connection with game play activity provided by the gaming system 100. In some embodiments, each reel 116 may operate independent of all other reels and the symbols displayed by a reel 116 at the end of a given spin may depend upon random numbers generated by the gaming system 100. The positions of symbols on each reel 116 and in the combination of reels 116 may form the array of symbols distributed throughout an array of cells. The distribution of symbols may be presented in a presentation order rendered to the display screen 104 of the gaming system 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the gaming system 100. The gaming system 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

Figure 2:
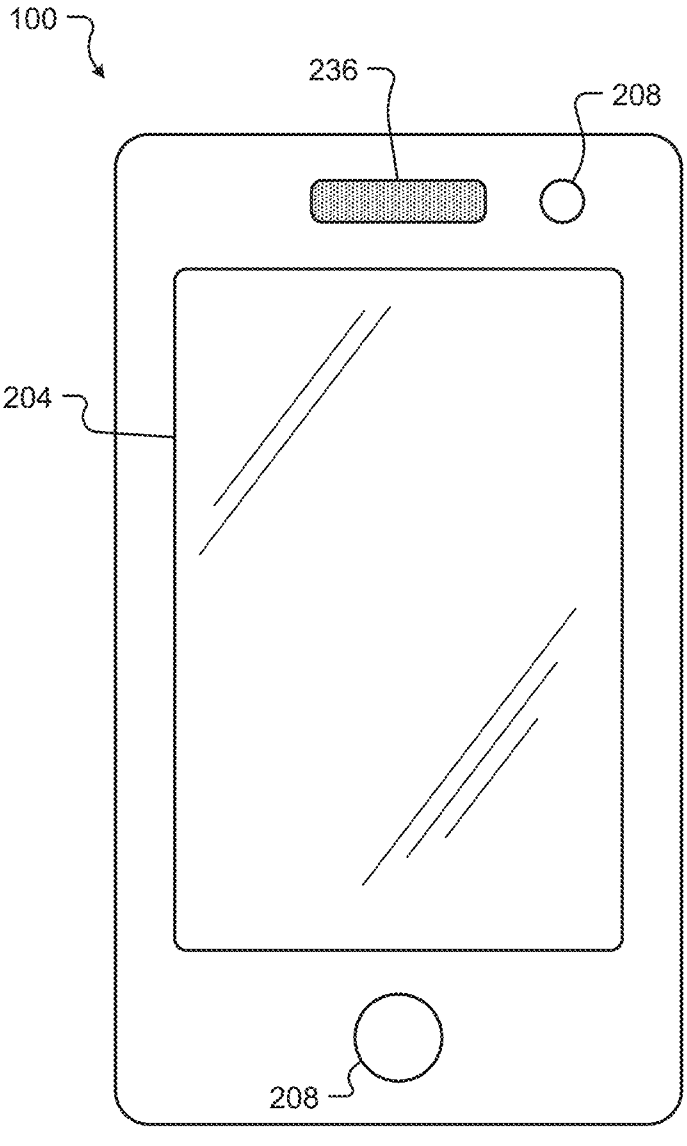
FIG. 2 is a diagram illustrating another exemplary gaming system in which embodiments of the present disclosure may be implemented.

FIG. 2 is a diagram illustrating another exemplary gaming system in which embodiments of the present disclosure may be implemented. As illustrated in this example, the gaming system 100 may be implemented by software executing on a portable gaming system 100 such as a mobile smartphone, tablet, wearable, etc. The gaming system 100 may be owned by a user of the device rather than being owned by a casino operator. In other embodiments, the portable gaming system 100 may be owned by a casino operator and provided to a player for an amount of time, possibly under an agreement between the casino operator and the player. As an example, the portable gaming system 100 may be assigned to the player for a duration of their visit or stay at the casino, but the portable gaming system 100 may be returned by the player back to the casino operator after the visit or stay has concluded.

The gaming system 100 includes a display screen 204, a plurality of input devices 208, and at least one speaker 236. In some embodiments, the display screen 204 may correspond to a touch-sensitive display screen, meaning that the display screen 204 is simultaneously capable of displaying information (e.g., in connection with game play activity) and receiving a user input. In some embodiments, the touch-sensitive display screen 204 may provide game features similar to a cabinet-style gaming system 100 without requiring all of the dedicated buttons provided by a cabinet-style gaming system 100.

Figure 3A:
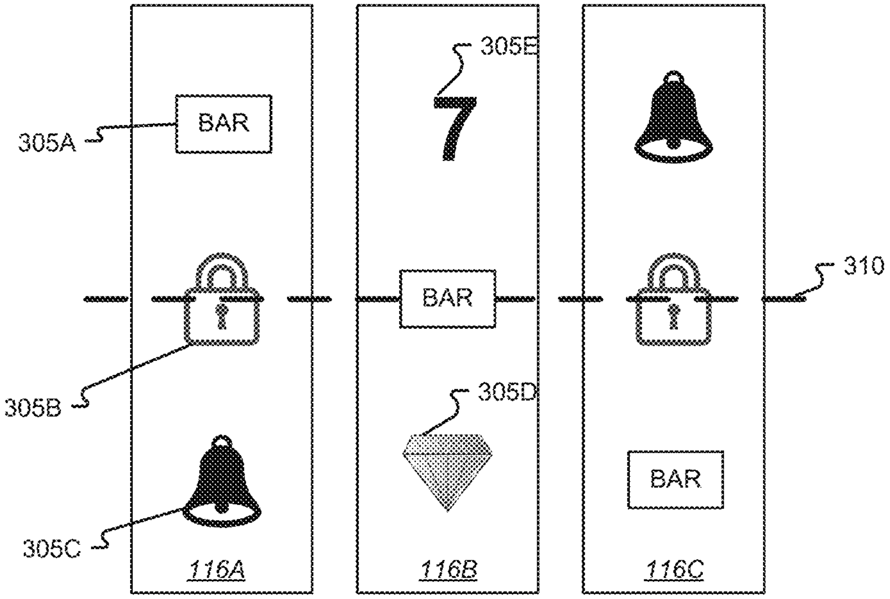
FIGS. 3A and 3B are diagrams illustrating implementation of a locking link in an electronic game according to embodiments of the present disclosure.

FIG. 3A is diagram illustrating implementation of a locking link in an electronic game according to one embodiment of the present disclosure. More specifically, this example illustrates a set of reels 116A-116C such as the reels 116 of the gaming system 100 described above. While three reels 116A-116C are illustrated here for the sake of simplicity, it should be understood that a greater number of reels 116 can be used in different implementations without departing from the scope of the present disclosure.

As noted, each reel 116A-116C can comprise a plurality of symbols 305A-305E. The plurality of symbols 305A-305E can comprise one or more symbols designated or defined as a symbol of interest 305A. The symbol of interest 305A may appear in one or more locations on one or more of the reels 116A-116C. Generally speaking, the symbol of interest 305A can be a symbol on one or more of the reels 116A-116C with a specific meaning in the electronic game such as a potential payout if the symbol lands on the payline described above. According to one embodiment, the symbol of interest 305A can be pre-defined for the electronic game, e.g., by the game designer. In other cases, the symbol of interest 305A may be selected prior to initiation of the electronic game, e.g., by a player of the game, randomly by the gaming system 100, or in other ways.

The plurality of symbols 305A-305E can also comprise one or more symbols designated or defined as a lock symbol 305B. While the lock symbol 305B is shown here as resembling an actual lock, it should be understood that any type of symbol or graphic can be used in various implementations without departing from the scope of the present disclosure. Like the symbol of interest 305A, the lock symbol 305B may appear in one or more locations on one or more of the reels 116A-116C and can be pre-defined for the electronic game, e.g., by the game designer. In other cases, the lock symbol 305B may be selected prior to initiation of the electronic game, e.g., by a player of the game, randomly by the gaming system 100, or in other ways.

Once the player starts playing the electronic game, the gaming system 100 can initiate rotation of the reel 116A-116C. The reels 116A-116C can each rotate independently for different amounts of time, e.g., based on a random number generated by the gaming system 100. Upon the rotation of one of the reels stopping, for example reel 116A, a position of the lock symbol 305B on that reel 116A can be detected by the gaming system 100. Upon the rotation of another reel stopping, for example reel 116C, a position of the lock symbol 305B on that reel 116C can be detected by the gaming system 100. According to one embodiment, if the stopped reels are non-adjacent such as reels 116A and 116C as in this example, a locking link can be created by the gaming system 100 between the position of the lock symbol 305B on reel 116A and the position of the lock symbol 305B on reel 116C. The locking link can comprise a virtual line 310 between the position of the lock symbol 305B on reel 116A and the position of the lock symbol 305B on reel 116C. According to one embodiment, the virtual line 310 may not be displayed or indicated by the gaming system 100 other than by the presence of the lock symbols 305B. In other cases, some visual representation of the virtual line 310 can be presented by the gaming system 100 such as a representation of a line, a net, or other graphic.

While the remaining, rotating reel 116B is still rotating, a position of the symbol of interest 305A on that reel 116B can be determined and tracked by the gaming system 100. As the position of the symbol of interest 305A on the rotating reel 116B reaches the position on that reel 116B through which the virtual line 310 of the locking link passes, rotation of the reel 116B can be stopped by the gaming system 100. In this way, the locking link can appear to "catch" or "capture" the symbol of interest 305A on the reel 116B located between the lock symbols 305B.

It should be noted and understood that the virtual line 310 representing the locking link need not coincide with a payline 120 of the electronic game. Rather, the virtual line 310 can comprise any horizontal, diagonal, or vertical line extending between the positions of the lock symbols 305B of stopped, non-adjacent reels 116A and 116C wherever the positions of the lock symbols 305B may be on the non-adjacent reels 116A and 116C. However, the locking link may, in some cases, cause the symbol of interest 305A on the still rotating reel 116B or reels to stop on the payline 120 which may result in a win and payout for the player depending upon the game. In other cases, depending upon the location on the rotating reel 116B through which the virtual line 310 passes, the locking link may cause a different symbol of the rotating reel 116B to land on the payline 120 which may either positively or negatively effect the outcome of the electronic game. In this way, locking links provide an additional dynamic element which can affect the outcome of the electronic game thereby increasing player interest and engagement.

Figure 3B:
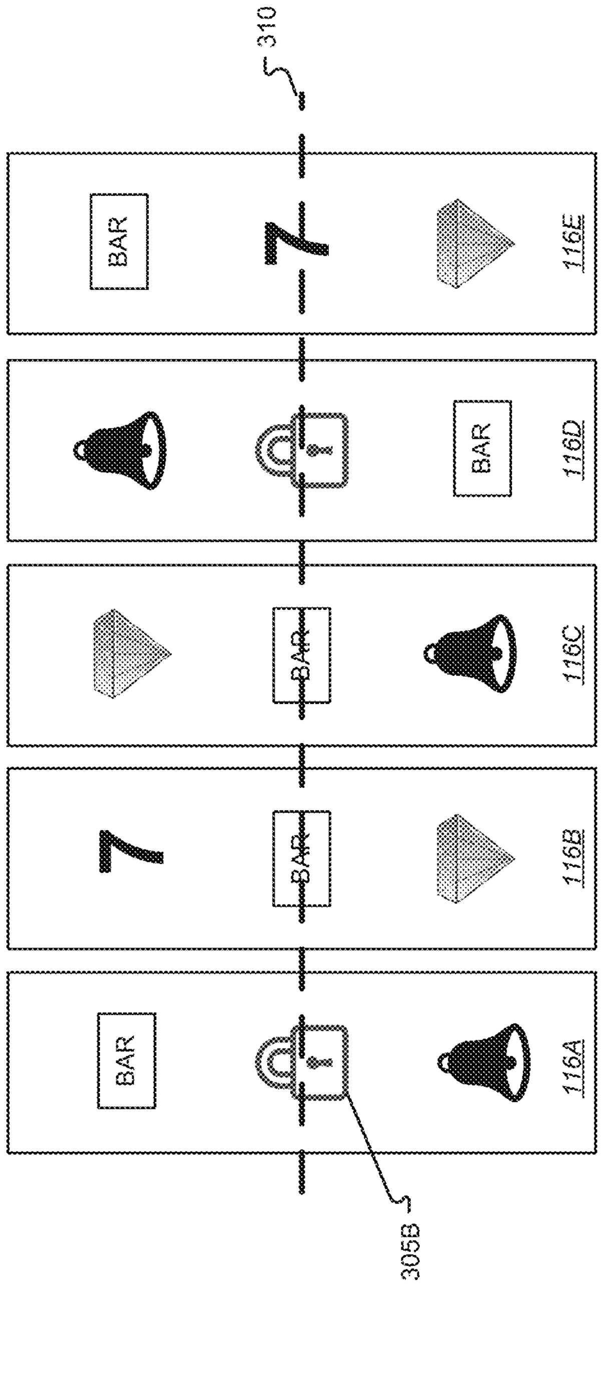

It should also be noted and understood that the reels 116A and 116C on which the lock symbol is detected need not be separated by a single other reel 116B as illustrated in FIG. 3A. Rather, and as noted above, a greater number of reels may be used depending upon the gaming system 100 implementation. FIG. 3B is diagram illustrating implementation of a locking link in an electronic game according to another embodiment of the present disclosure. In this example, the gaming system 100 utilizes five reels 116A-116E. The lock symbol 305B can appear on any of the five reels 116A-116E and a locking link can be created between any two of the reels 116A-116E as long as they are non-adjacent. So, for example and as illustrated here, a locking link represented by virtual line 310 can be created between the lock symbol 305B on the leftmost reel 116A and the reel 116D second from the right. In other cases, the locking link could be created, for example, between the leftmost reel 116A and the rightmost reel 116E or any other two non-adjacent reels of the set of reels 116A-116E.

Figure 4:
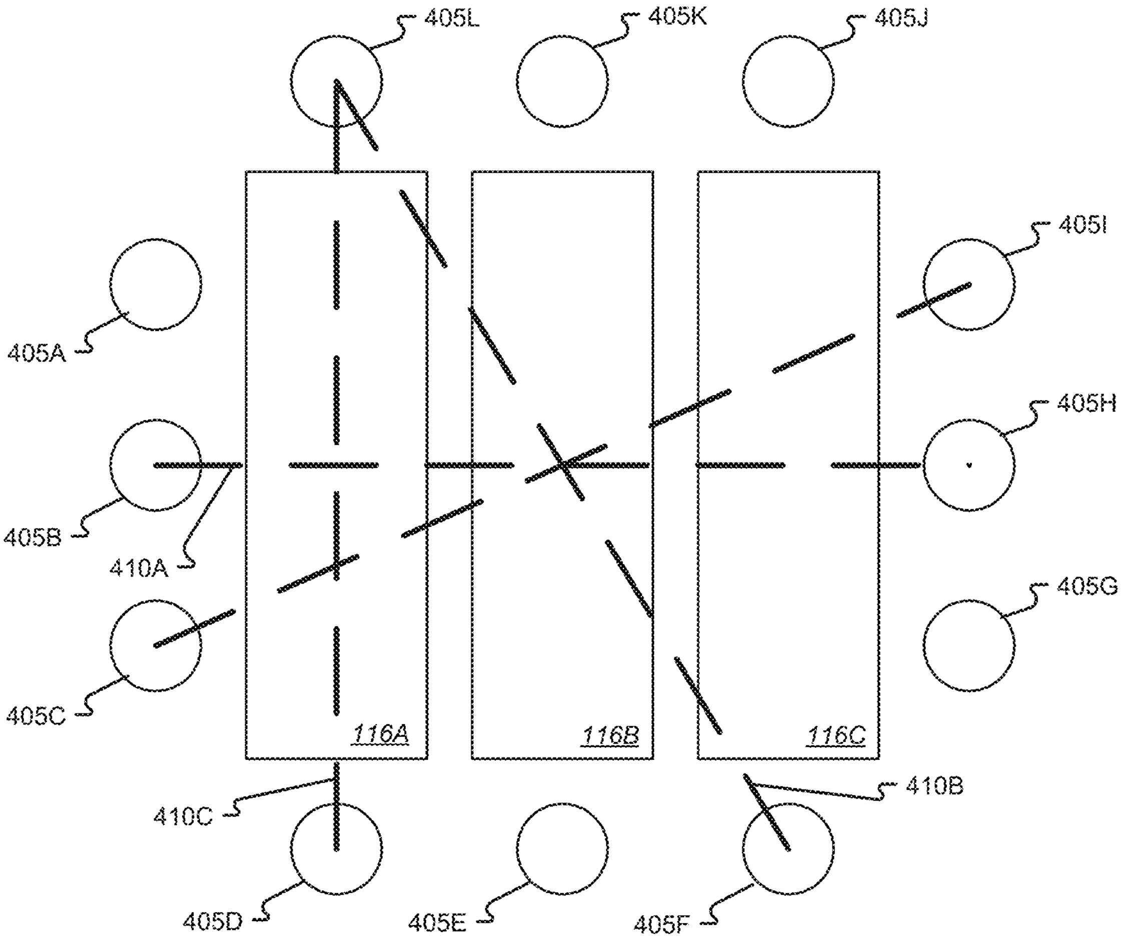
FIG. 4 is diagram illustrating implementation of locking links in an electronic game according to another embodiment of the present disclosure.

FIG. 4 is diagram illustrating implementation of locking links in an electronic game according to another embodiment of the present disclosure. According to one embodiments, features of the electronic game in addition to the reels 116A-116C themselves may be used to represent locking links. As used herein, the term feature is intended to mean any physical or graphical element of the gaming system 100 involved in representing play of the electronic game. For example, the reels 116A-116C, whether physical reels or graphical representations of reels, are considered to be features of the electronic game. Additionally, or alternatively, the features can include, but are not limited to, any one or more of lights, graphical elements on a display, moveable physical elements, etc. The example of FIG. 4 represents a number of features including a set of reels 116A-116C as described above and a set of other features 405A-405L adjacent to the reels 116A-116C. The features 405A-405L can comprise, for example, lights or other indicators adjacent to and possibly surrounding the reels 116A-116C. In other cases, such as when the reels 116A-116C are represented graphically on a display, the features 405A-405L can comprise any of a wide variety and various combinations of symbols, graphics, text, and/or other indicators.

In this example, features 405A-405L can be used instead of or in addition to the reels 116A-116C to represent locking links. These features may be turned on or controlled based on a random process, for example, implemented within the electronic game. For example, the one or more features, such as features 405B and 405H, can illuminate, be displayed, or otherwise change to indicate a lock and a created locking link therebetween as indicated by horizontal virtual line 410A. As noted above, the virtual line can also be diagonal as represented by virtual line 410B between features 405F and 405L, or vertical as represented by virtual line 410C between features 405D and 405L. As described above, once the locking link is created, the gaming system can stop symbols of interests on one or more rotating reels 116A-116C that reach a point through which the virtual line 410A-410C passes.

It should be noted that locking links can be created between any non-adjacent feature of the electronic game including the reels 116A-116C and other features 405A-405L. For example, a locking link can be created between feature 405C and reel 116B that would affect reel 116A if feature 405C was activated and reel 116B stopped while reel 116A was still rotating. Similarly, a locking link could be created between reel 116A and feature 405G that would affect reels 116B and 116C if reel 116A stopped and feature 405G was activated while reels 116B and 116C were still rotating. Additionally, more than one locking link may be created at one time. For example, if features 405B and 405I were activated and reel 116B stopped while reels 116A and 116C were still rotating, one locking link could be created between feature 405B and reel 116B affecting reel 116A while another locking link could be created between reel 116B and feature 405I affecting reel 116C. Numerous other variations and combinations are contemplated and are considered to be within the scope of the present disclosure.

Figure 5:
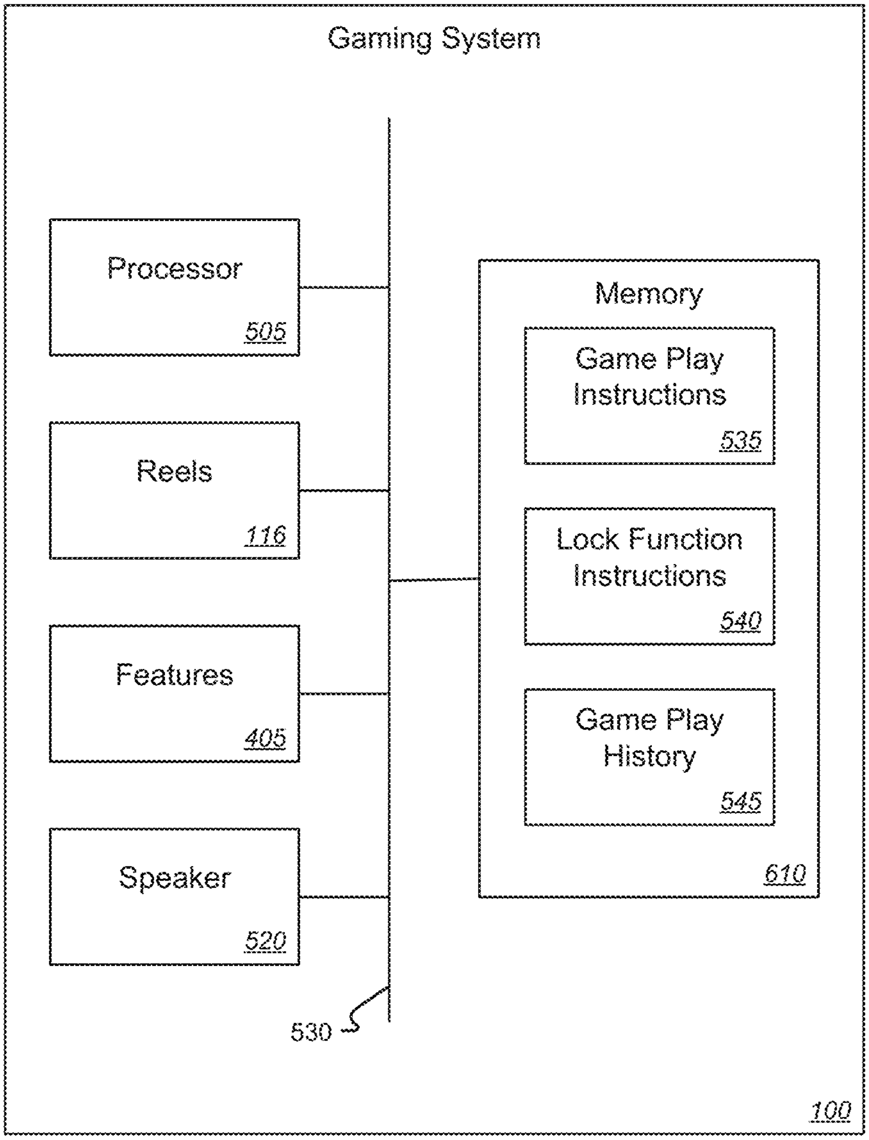
FIG. 5 is a block diagram illustrating additional details of components of an exemplary gaming system according to one embodiment of the present disclosure.

FIG. 5 is a block diagram illustrating additional details of components of an exemplary gaming system according to one embodiment of the present disclosure. As illustrated in this example, gaming system 100 can comprise a processor 505. The processor 505 may correspond to one or many computer processing devices. For instance, the processor 505 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 505 may be provided as a microprocessor, Central Processing Unit (CPU), or plurality of microprocessors that are configured to execute the instructions sets stored in a memory 510. Upon executing the instruction sets stored in memory 510, the processor 505 enables various functions of the gaming system 100 as described herein.

A memory 510 can be coupled with and readable by the processor 505 via a communications bus 530. The memory 510 may include any type of computer memory device or collection of computer memory devices. Non-limiting examples of memory 510 include Random Access Memory (RAM), Read Only Memory (ROM), flash memory, Electronically-Erasable Programmable ROM (EEPROM), Dynamic RAM (DRAM), etc. The memory 510 may be configured to store the instruction sets depicted in addition to temporarily storing data for the processor 505 to execute various types of routines or functions.

The processor 505 can also be coupled with one or more one or more reels 116A-116C and/or other features 405A-405L. As noted above, the reels 116A-116C and/or features 405A-405L may either or both comprise physical elements of the gaming system 100 or may be graphically represented on one or more displays. In such cases, the display can comprise, for example, a Liquid Crystal Display (LCD), Light Emitting Diode (LED), Organic Light Emitting Diode (OLED), Plasma Display Panel (PDP), Cathode Ray Tube (CRT) display or other type of display for presenting video images. In some cases, the gaming system 100 may also comprise a speaker 520 also coupled with the communications bus 530 and producing audio output based on based on signals from the processor 505.

The memory 510 can store therein sets of instructions which, when executed by the processor 505, cause the processor 505 to operate an electronic game as described herein. More specifically, the memory 510 can store therein a set of game play instructions 535 which, when executed by the processor 505, can cause the processor 505 to initiate rotation of the reels 116A-116C and/or operate one or more features 405A-405L of the gaming system 100. The game play instructions 535 can cause the processor 505 to rotate each reel 116A-116C and/or operate each feature 405A-405L independently for different amounts of time.

The memory 510 can also store therein a set of lock function instructions 540 which, when executed by the processor 505, can cause the processor 505 to detect, upon the rotation of a first reel 116A or operation of a first feature 405A stopping, a position of a first lock symbol 305B on the first reel 116A or position of a lock indicator of the first feature 405A and detect, upon the rotation of a second reel 116C or operation of a second feature 405F stopping, a position of a second lock symbol 305B on the second reel 116C or position of a lock indicator of the second feature 405F. The lock function instructions 540 can then cause the processor 505 to create a locking link between the position of the first lock symbol 305B on the first reel 116A or position of the lock indicator of the first feature 405A and the position of the second lock symbol 305B on the second reel 116C or position of the lock indicator of the second feature 405F. The locking link can comprise a horizontal, diagonal, or vertical virtual line 310 between the position of the first lock symbol 305B on the first reel 116A or position of the lock indicator of the first feature 405A and the position of the second lock symbol 305B on the second reel 116C or position of the lock indicator of the second feature 405F.

The lock function instructions 540 can further cause the processor 505 to detect, while the third reel 116B is still rotating, i.e., while the third feature is operating, a position of the symbol of interest 305A on the third reel of feature reaching a position through which the locking link passes. In response to detecting the position of the symbol of interest 305A reaching the position through which the locking link passes, the lock function instructions 540 can further cause the processor 505 to stop rotation of the third reel.

According to one embodiment, the lock function instructions 540 can further cause the processor 505, prior to stopping rotation of the third reel 116B, to determine a rate for applying a locking function. That is, the locking function may not be available at all times and may be applied only after a certain amount of time or after a predetermined number of re-spins etc. Stopping rotation of the third reel can be performed by the processor 505 in response to the rate exceeding a threshold value for time, re-spins, etc. Additionally, or alternatively, the lock function instructions 540 can further cause the processor 505, prior to stopping rotation of the third reel 116B, to determine whether a locking function is enabled and stop rotation of the third reel in response to the locking function being enabled for an electronic game. For example, the locking function of the electronic game can be enabled based on eligibility of the electronic game for enabling the locking function, wherein the eligibility of the electronic game for enabling the locking function is based on a game play history 545 of the electronic game maintained in the memory 510 for a current game session.

Figure 6:
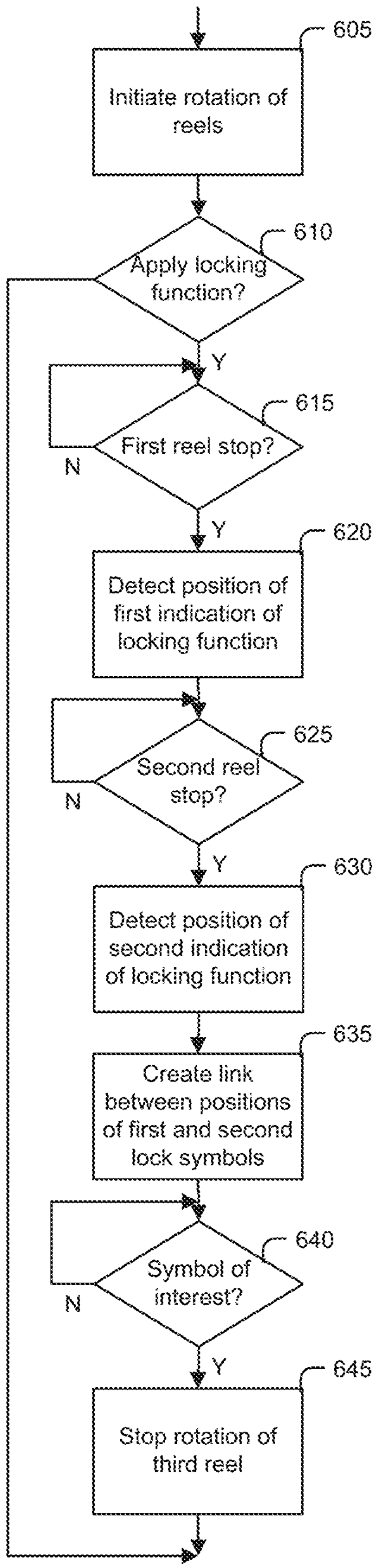
FIG. 6 is a flowchart illustrating an exemplary process for operating an electronic game with locking links according to one embodiment of the present disclosure.

FIG. 6 is a flowchart illustrating an exemplary process for operating an electronic game with locking links according to one embodiment of the present disclosure. As illustrated in this example, operating an electronic game with locking links can begin with initiating 605 rotation of a first reel 116A, a second reel 116C, and a third reel 116B of a gaming system 100. The first reel 116A, the second reel 116C, and the third reel 116B can each rotate independently for different amounts of time.

A determination 610 can be made as to whether to apply a locking function to the electronic game. Determining 610 whether to apply the locking function can comprise determining a rate for applying the locking function, e.g., after a predetermined amount of time or number of re-spins, etc. Additionally, or alternatively, determining 610 whether to apply the locking function can comprise determine whether a locking function is enabled, e.g., based on eligibility of the player of the electronic game for enabling the locking function. The eligibility of the electronic game for enabling the locking function is based on a game play history of the electronic game for a current game session. In response to determining 610 to not apply the locking function processing can end and allow the electronic game to proceed normally.

In response to determining 610 to apply the locking function, a determination 615 can be made as to whether rotation of the first reel 116A has stopped. Upon the rotation of the first reel 116A stopping, a position of the first lock symbol 305B on the first reel 116A can be detected 620. A further determination 625 can be made as to whether rotation of the second reel 116C has stopped. Upon the rotation of the second reel 116C stopping, a position of the second lock symbol 305B on the second reel 116C can be detected.

A locking link can be created 635 between the position of the first lock symbol 305B on the first reel 116A and the position of the second lock symbol 305B on the second reel 116C. The locking link can comprise a horizontal, diagonal, or vertical virtual line 310 between the first lock symbol 305B on the first reel 116A and the second lock symbol 305B on the second reel 116C. While the third reel 116B is still rotating, a determination 640 can be made as to whether a position of the predefined symbol of interest 305A on the third reel 116B is reaching a position through which the locking link passes. In response to determining 640 the position of the symbol of interest 305A is reaching the position through which the locking link passes, rotation of the third reel 116B can be stopped 645.

Figure 7:
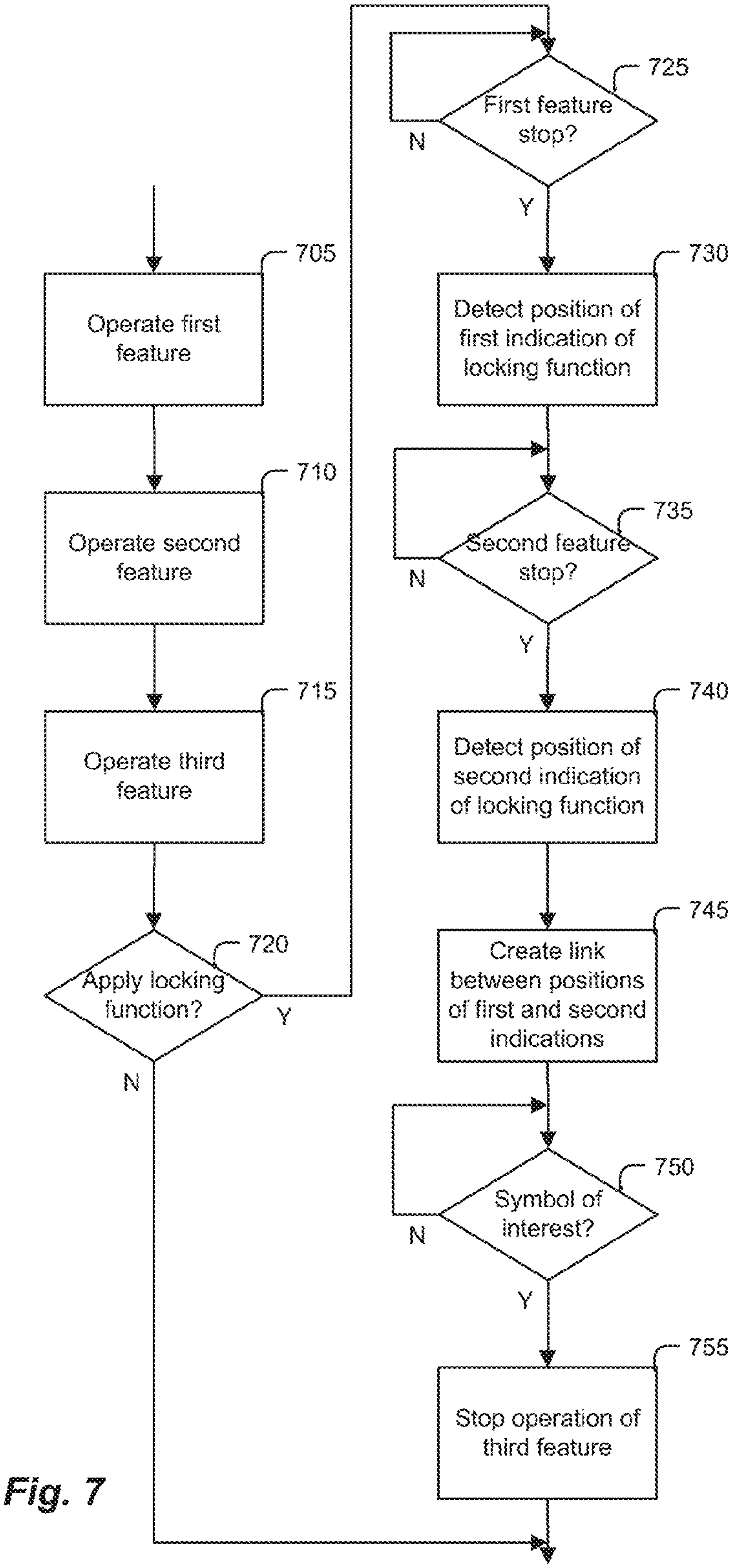
FIG. 7 is a flowchart illustrating an exemplary process for operating an electronic game with locking links according to another embodiment of the present disclosure.

FIG. 7 is a flowchart illustrating an exemplary process for operating an electronic game with locking links according to another embodiment of the present disclosure. As illustrated in this example, operating an electronic game with locking links can begin with operating 705 a first feature of the electronic game, the first feature comprising a first indication of a lock function of the electronic game, operating 710 a second feature of the electronic game independent of the first feature, the second feature comprising a second indication of the lock function of the electronic game, and operating 715 a third feature of the electronic game independent of the first feature and the second feature. The first feature and the second feature can be non-adjacent on the gaming system 100, the third feature can be disposed between the first feature and the second feature on the gaming system, and the third feature comprises an indication of a symbol of interest in the electronic game. For example, the first feature, second feature, and third feature can each comprise a rotating reel 116A, 116B, and 116C of the gaming system 100. In another example, the first feature 405A and second feature 405G can each comprise a visual indicator and on a surface of the gaming system 100 and the third feature can comprise a rotating reel 116A of the gaming system 100.

A determination 720 can be made as to whether to apply a locking function to the electronic game. Determining 720 whether to apply the locking function can comprise determining a rate for applying the locking function, e.g., after a predetermined amount of time or number of re-spins, etc. Additionally, or alternatively, determining 720 whether to apply the locking function can comprise determine whether a locking function is enabled, e.g., based on eligibility of the player of the electronic game for enabling the locking function. The eligibility of the electronic game for enabling the locking function is based on a game play history of the electronic game for a current game session. In response to determining 720 to not apply the locking function processing can end and allow the electronic game to proceed normally.

In response to determining 720 to apply the locking function, a determination 725 can be made as to whether the first feature has stopped operating. Upon determining 725 operation of the first feature has stopped, a position of the first indication of the locking function can be detected 730. A further determination 735 can be made as to whether the second feature has stopped operating. Upon determining 735 operation of the second feature has stopped, a position of the second indication of the locking function can be detected 740.

A locking link can then be created 745 between the position of the first indication of the locking function and the position of the second indication of the locking function. The locking link can comprise a horizontal, diagonal, or vertical virtual line connecting the position of the first indication of the locking function and the position of the second indication of the locking function. A determination 750 can be made as to whether a position of the predefined symbol of interest 305A on the third feature is reaching a position through which the locking link passes. In response to determining 640 the position of the symbol of interest 305A is reaching the position through which the locking link passes, operation of the third feature can be stopped 755.

As used herein, the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A method for operating an electronic game, the method comprising:

operating, by a processor of a gaming system, a first feature of the electronic game;

operating, by the processor of the gaming system, a second feature of the electronic game independent of the first feature, wherein the first feature and the second feature comprise visual elements involved in representing play of the electronic game;

operating, by the processor of the gaming system, a third feature of the electronic game independent of the first feature and the second feature, wherein the first feature and the second feature are non-adjacent on the gaming system, wherein the third feature is disposed between the first feature and the second feature on the gaming system, and wherein the third feature comprises a visual indication of a symbol of interest in the electronic game;

detecting, by the processor of the gaming system, a position of a first indication of a locking function, wherein operating the first feature comprises presenting the first indication of the locking function at the detected position;

detecting, by the processor of the gaming system, a position of a second indication of the locking function, wherein operating the second feature comprises presenting the second indication of the locking function at the detected position;

detecting, by the processor of the gaming system, while the third feature is still operating, the symbol of interest at a position through which a line between the position of the first indication of the lock function and the position of the second indication of the lock function passes; and in response to detecting the symbol of interest at the position through which the line between the position of the first indication of the lock function and the position of the second indication of the lock function passes, stopping, by the processor of the gaming system, operation of the third feature.

2. The method of claim 1, wherein the symbol of interest is selected by a player of the electronic game.

3. The method of claim 1, wherein the symbol of interest is selected by the gaming system.

4. The method of claim 3, wherein the symbol of interest is selected randomly.

5. The method of claim 1, wherein the first indication and the second indication are selected by a player of the electronic game.

6. The method of claim 1, wherein the first indication and the second indication are selected by the gaming system.

7. The method of claim 3, wherein the first indication and the second indication are is selected randomly.

8. The method of claim 1, wherein the locking function affects a result of the electronic game.

9. A gaming system comprising:

a processor; and a memory coupled with and readable by the processor and storing therein a set of instructions which, when executed by the processor, causes the processor to:

operate a first feature of an electronic game;

operate a second feature of the electronic game independent of the first feature, wherein the first feature and the second feature comprise visual elements involved in representing play of the electronic game;

operate a third feature of the electronic game independent of the first feature and the second feature, wherein the first feature and the second feature are non-adjacent on the gaming system, wherein the third feature is disposed between the first feature and the second feature on the gaming system, and wherein the third feature comprises a visual indication of a symbol of interest in the electronic game;

detect a position of a first indication of a locking function, wherein operating the first feature comprises presenting the first indication of the locking function at the detected position;

detect a position of a second indication of the locking function, wherein operating the second feature comprises presenting the second indication of the locking function at the detected position;

detect while the third feature is still operating, the symbol of interest at a position through which a line between the position of the first indication of the lock function and the position of the second indication of the lock function passes; and in response to detecting the symbol of interest at the position through which the line between the position of the first indication of the lock function and the position of the second indication of the lock function passes, stop operation of the third feature.

10. The gaming system of claim 9, further comprising a display device coupled with the processor, wherein the first feature and the second feature are elements of the electronic game displayed on the display device.

11. The gaming system of claim 10, wherein presenting the first indication of the locking function and the second indication of the locking function further comprises displaying a graphical representation of a line between the first indication and the second indication.

12. The gaming system of claim 10, wherein presenting the first indication of the locking function and the second indication of the locking function further comprises displaying a graphical representation of a net between the first indication and the second indication.

13. The gaming system of claim 9, further comprising a plurality of lights on an exterior of the gaming system, wherein the first feature and the second feature each comprise a light of the plurality of lights.

14. The gaming system of claim 9, further comprising a plurality of physical moveable elements, wherein the first feature, second feature, and third feature each comprise a physical moveable element of the plurality of physical moveable elements.

15. The gaming system of claim 9, wherein the gaming system comprises an Electronic Gaming Machine (EGM).

16. The gaming system of claim 9, wherein the gaming system comprises a mobile device.

17. The gaming system of claim 9, wherein the gaming system comprises a personal computer.

18. A non-transitory, computer-readable medium comprises a set of instructions stored therein which, when executed by a processor, causes the processor to:

operate a first feature of an electronic game;

operate a second feature of the electronic game independent of the first feature, wherein the first feature and the second feature comprise visual elements involved in representing play of the electronic game;

operate a third feature of the electronic game independent of the first feature and the second feature, wherein the first feature and the second feature are non-adjacent on the gaming system, wherein the third feature is disposed between the first feature and the second feature on the gaming system, and wherein the third feature comprises a visual indication of a symbol of interest in the electronic game;

detect a position of a first indication of a locking function, wherein operating the first feature comprises presenting the first indication of the locking function at the detected position;

detect a position of a second indication of the locking function, wherein operating the second feature comprises presenting the second indication of the locking function at the detected position;

detect while the third feature is still operating, the symbol of interest at a position through which a line between the position of the first indication of the lock function and the position of the second indication of the lock function passes; and in response to detecting the symbol of interest at the position through which the line between the position of the first indication of the lock function and the position of the second indication of the lock function passes, stop operation of the third feature.

19. The non-transitory, computer-readable medium of claim 18, wherein the instructions further cause the processor to:

detect a position of a third indication of the locking function, wherein operating the first feature further comprises presenting the third indication of the locking function at the detected position;

detect a position of a fourth indication of the locking function, wherein operating the second feature comprises presenting the fourth indication of the locking function at the detected position;

detect while the third feature is still operating, the symbol of interest at a position through which a line between the position of the third indication of the lock function and the position of the fourth indication of the lock function passes; and in response to detecting the symbol of interest at the position through which the line between the position of the third indication of the lock function and the position of the fourth indication of the lock function passes, stop operation of the third feature.

20. The non-transitory, computer-readable medium of claim 19, wherein the locking function affects a result of the electronic game.

* * * * *